United States Patent
Kim et al.

(10) Patent No.: US 11,159,345 B2
(45) Date of Patent: Oct. 26, 2021

(54) METHOD FOR ESTIMATING SELF-INTERFERENCE CHANNEL AND DEVICE FOR SAME

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Dongkyu Kim, Seoul (KR); Kwangseok Noh, Seoul (KR); Sooyong Choi, Seoul (KR); Kyungsik Min, Seoul (KR); Sangjoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 16/301,383

(22) PCT Filed: Apr. 26, 2017

(86) PCT No.: PCT/KR2017/004416
§ 371 (c)(1),
(2) Date: Nov. 13, 2018

(87) PCT Pub. No.: WO2017/196007
PCT Pub. Date: Nov. 16, 2017

(65) Prior Publication Data
US 2020/0322184 A1    Oct. 8, 2020

Related U.S. Application Data

(60) Provisional application No. 62/335,697, filed on May 13, 2016.

(51) Int. Cl.
*H04L 25/02* (2006.01)
*H04L 1/08* (2006.01)
(Continued)

(52) U.S. Cl.
CPC ....... *H04L 25/0202* (2013.01); *H04B 7/0413* (2013.01); *H04L 1/08* (2013.01);
(Continued)

(58) Field of Classification Search
CPC . H04L 25/0202; H04L 1/1858; H04L 5/0048; H04L 5/14; H04B 7/0413;
(Continued)

(56) References Cited

U.S. PATENT DOCUMENTS

2012/0201153 A1    8/2012   Bharadia et al.
2013/0286903 A1*  10/2013   Khojastepour ........ H04B 1/123
                                                          370/280
(Continued)

FOREIGN PATENT DOCUMENTS

KR    20100088555 A  *  8/2010  .......... H04B 7/0617
KR    1020100088555      8/2010
(Continued)

OTHER PUBLICATIONS

PCT International Application No. PCT/KR2017/004416, Written Opinion of the International Searching Authority dated Aug. 14, 2017, 21 pages.
(Continued)

*Primary Examiner* — Ayaz R Sheikh
*Assistant Examiner* — Louis Samara
(74) *Attorney, Agent, or Firm* — Lee, Hong, Degerman, Kang & Waimey

(57) ABSTRACT

A method for estimating a self-interference channel by a communication device which operates in a full-duplex mode can comprise the steps of: determining the amount of resources to be used for estimating a self-interference channel for each antenna; transmitting a reference signal by means of resources distinguished by means of each antenna in accordance with the amount of resources that has been
(Continued)

determined for each antenna; and estimating the self-interference channel on the basis of the reference signal.

14 Claims, 15 Drawing Sheets

(51) Int. Cl.
  *H04L 5/00* (2006.01)
  *H04L 5/14* (2006.01)
  *H04W 24/08* (2009.01)
  *H04W 72/08* (2009.01)
  *H04B 7/0413* (2017.01)

(52) U.S. Cl.
  CPC .............. *H04L 5/0048* (2013.01); *H04L 5/14* (2013.01); *H04L 25/0224* (2013.01); *H04W 24/08* (2013.01); *H04W 72/082* (2013.01)

(58) Field of Classification Search
  CPC ......... H04B 1/123; H04B 7/06; H04W 24/08; H04W 72/082; H04W 72/0246; H04W 72/0446
  See application file for complete search history.

(56) References Cited

U.S. PATENT DOCUMENTS

| | | |
|---|---|---|
| 2013/0301487 A1 | 11/2013 | Khandani |
| 2014/0146765 A1 | 5/2014 | Ji et al. |
| 2015/0103802 A1 | 4/2015 | Cheng et al. |
| 2015/0131452 A1* | 5/2015 | Choi ................. H04W 72/0446 370/241 |
| 2016/0330011 A1 | 11/2016 | Lee et al. |
| 2017/0223688 A1* | 8/2017 | Chen ....................... H04B 7/06 |
| 2017/0331577 A1 | 11/2017 | Parkvall et al. |

FOREIGN PATENT DOCUMENTS

| | | | | |
|---|---|---|---|---|
| KR | 20160019431 A | * | 2/2016 | ........ H04W 72/0453 |
| KR | 1020160019431 | | 2/2016 | |
| KR | 20160023666 A | * | 3/2016 | ........... H04B 17/345 |
| KR | 1020160023666 | | 3/2016 | |
| WO | WO-2012063351 A1 | * | 5/2012 | .......... H04W 72/046 |
| WO | 2015094914 | | 6/2015 | |
| WO | 2016060466 | | 4/2016 | |
| WO | 2016064046 | | 4/2016 | |

OTHER PUBLICATIONS

PCT International Application No. PCT/KR2017/004418, Written Opinion of the International Searching Authority dated Jul. 28, 2017, 16 pages.

U.S. Appl. No. 16/301,204, Notice of Allowance dated Feb. 24, 2021, 13 pages.

* cited by examiner

METHOD FOR ESTIMATING SELF-INTERFERENCE CHANNEL AND DEVICE FOR SAME

CROSS-REFERENCE TO RELATED APPLICATIONS

This application is the National Stage filing under 35 U.S.C. 371 of International Application No. PCT/KR2017/004416, filed on Apr. 26, 2017, which claims the benefit of U.S. Provisional Application No. 62/335,697, filed on May 13, 2016, the contents of which are all hereby incorporated by reference herein in their entirety.

TECHNICAL FIELD

The present invention relates to a wireless communication system, and more particularly, to a method of estimating a self-interference channel and an apparatus therefor.

BACKGROUND ART

As a general expression of wireless transmission, in case of performing wireless transmission between a base station and a user equipment (UE), a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD). When a time domain radio resource is divided into a DL time duration resource and a UL time duration resource on the same frequency band and transmission and reception are performed, it is referred to as time division duplex (TDD).

Full-Duplex communication or Full-Duplex Radio (hereinafter, FDR) corresponds to a scheme that a single node performs transmission and reception at the same time in the same time and frequency resources. The FDR is distinguished from legacy half-duplex communication in that the legacy half duplex uses time resources or frequency resources by dividing the resources to make the resources to be orthogonal. Compared to the half-duplex communication scheme, the FDR can theoretically make system capacity to be doubled.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

DISCLOSURE OF THE INVENTION

Technical Tasks

A technical task of the present invention is to provide a method for a communication device operating in a full duplex mode to estimate a self-interference channel.

Another technical task of the present invention is to provide a communication device in a full-duplex mode for estimating a self-interference channel.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for estimating a self-interference channel by a communication device operating in a full duplex mode, includes the steps of determining an amount of resources to be used for estimating the self-interference channel per antenna, transmitting a reference signal through a resource distinguished by each antenna per a amount of resource determined according to each antenna, and estimating the self-interference channel based on the reference signal.

The step of determining the amount of resource further includes the steps of, when an additional resource unit is allocated per each antenna, determining an antenna having a maximum reduction value of a sum of power of residual self-interference signal components in a receiving end of the communication device, allocating the additional resource unit for a reference signal to be transmitted in the determined antenna, and repeating the antenna determining step and the additional resource unit allocating step until a total amount of resource allocated to each antenna becomes identical to a total number of available resource units for transmitting the reference signal.

The amount of resource to be used for estimating the self-interference channel per antenna may correspond to an amount of resource which is allocated when a total amount of resource allocated to each antenna becomes identical to a total number of available resource units for transmitting the reference signal. The repetition may be performed as many as the total number of available resource units for transmitting the reference signal. The resource unit may correspond to a resource element (RE).

The method may further include the step of storing information on an estimation result of the self-interference channel. The self-interference channel may be estimated using a reference signal received according to each antenna. The communication device may correspond to a user equipment or a base station.

To further achieve these and other advantages and in accordance with the purpose of the present invention, according to a different embodiment, a communication device of a full duplex mode for estimating a self-interference channel includes a processor configured to determine an amount of resources to be used for estimating the self-interference channel per antenna and a transmitter configured to transmit a reference signal through a resource distinguished by each antenna according to the amount of resource determined per each antenna. In this case, the processor may be configured to estimate the self-interference channel based on the reference signal.

When the amount of resource is determined, the processor determines an antenna having a maximum reduction value of a sum of power of residual self-interference signal components in a receiving end of the communication device when an additional resource unit is allocated per each antenna, allocates the additional resource unit for the reference signal to be transmitted in the determined antenna, and repeats determination of the antenna and allocation of the additional resource unit until the total amount of resource allocated to each antenna becomes identical to the total number of available resource units for transmitting the reference signal.

The amount of resource to be used for estimating the self-interference channel per each antenna may correspond to an amount of resources which are allocated when the total amount of resource allocated to each antenna becomes identical to the total number of available resource units for transmitting the reference signal. The repetition can be performed as many as the total number of available resource units for transmitting the reference signal. The resource unit may correspond to a resource element (RE). The self-interference channel can be estimated using a reference signal received per each antenna. The processor may estimate the self-interference channel using the reference signal received per each antenna. The communication device may correspond to a user equipment or a base station.

Advantageous Effects

According to one embodiment of the present invention, it is able to estimate a self-interference channel by transmitting a reference signal using REs less than the number of antennas. And, when the number of REs to be used for reference signal duration is given, if the sum of power of the residual self-interference signal component is minimized after a procedure of a reception end of a communication device is performed, it is able to maximize performance of a full duplex system.

According to one embodiment of the present invention, when the number of REs to be used for transmitting a reference signal is reduced, it is able to increase the number of REs to be used for a section for which data is transmitted and received. In particular, in case of a full duplex system, since DL transmission and UL transmission are performed at the same time in a section for which data is transmitted and received, it is able to increase data transfer rates of DL data and UL data at the same time when either a base station or a user equipment (UE) uses REs less than the number of antennas to transmit a reference signal according to the present invention.

According to the present invention, when the number of REs used for transmitting a reference signal is reduced, since a size of a matrix for estimating a self-interference channel via a method such as LS (Least Square) or MMSE (Minimum Mean Square Error) is reduced, it is able to reduce complexity of self-interference channel estimation.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes a $3^{rd}$ Generation Partnership Project (3GPP) Long Term Evolution (LTE) system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Moreover, in the following description, specific terminologies are provided to help the understanding of the present invention. And, the use of the specific terminology can be modified into another form within the scope of the technical idea of the present invention.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present invention may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

Figure 1:
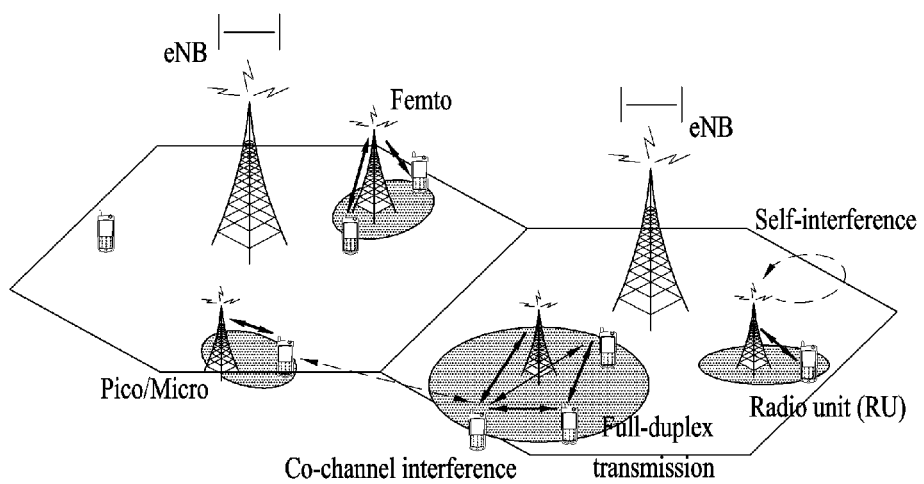
FIG. 1 is a conceptual diagram of a user equipment and a base station supporting FDR.
Figure 2:
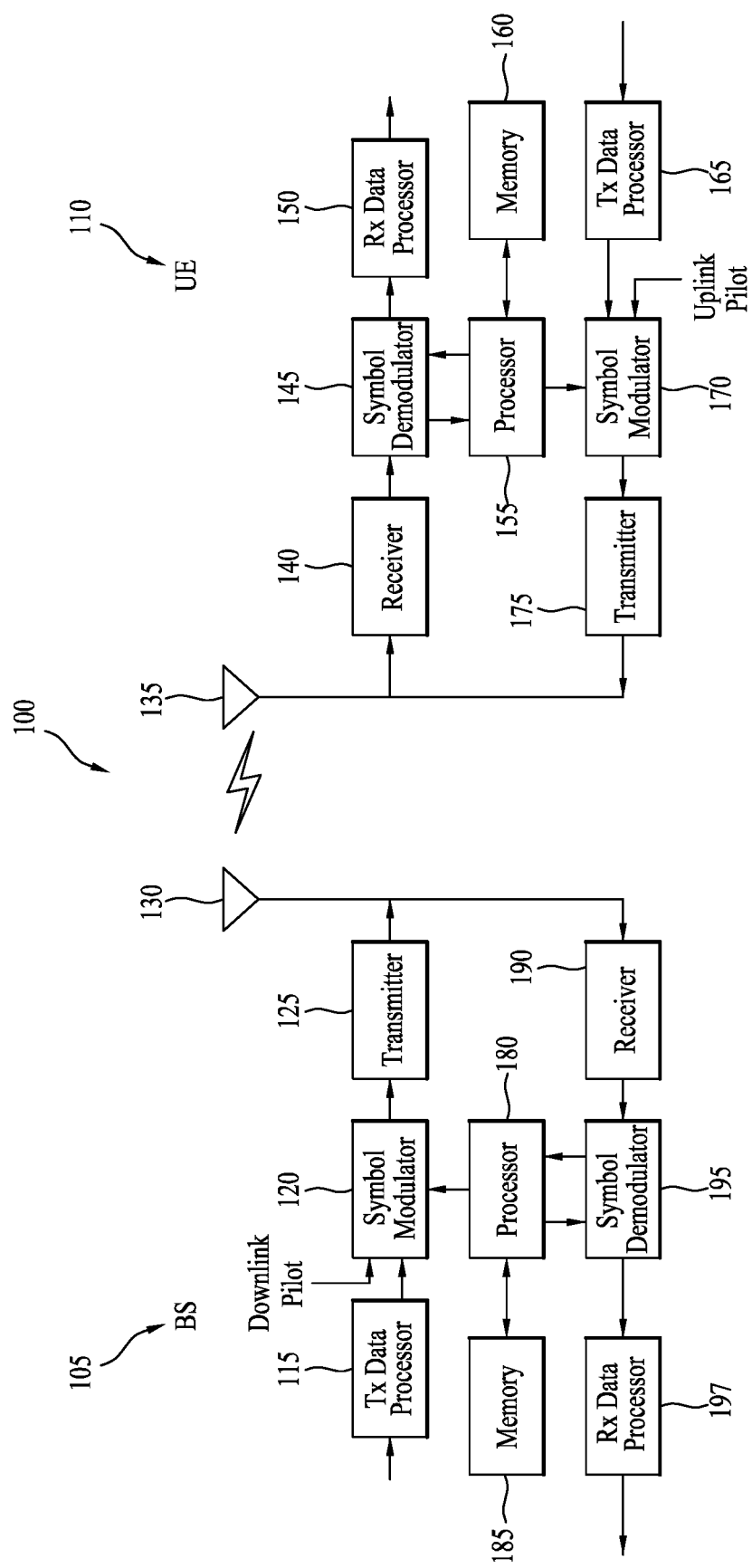
FIG. 2 is a block diagram illustrating configurations of a base station 105 and a user equipment 110 in a wireless communication system 100.

FIG. 2 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 2, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a Tx data processor 165, a symbol modulator 170, a transmitter 175, a transceiving antenna 135, a processor 155, a memory 160, a receiver 140, a symbol demodulator 145 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a Multiple Input Multiple Output (MIMO) system. And, the BS 105 according to the present invention may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
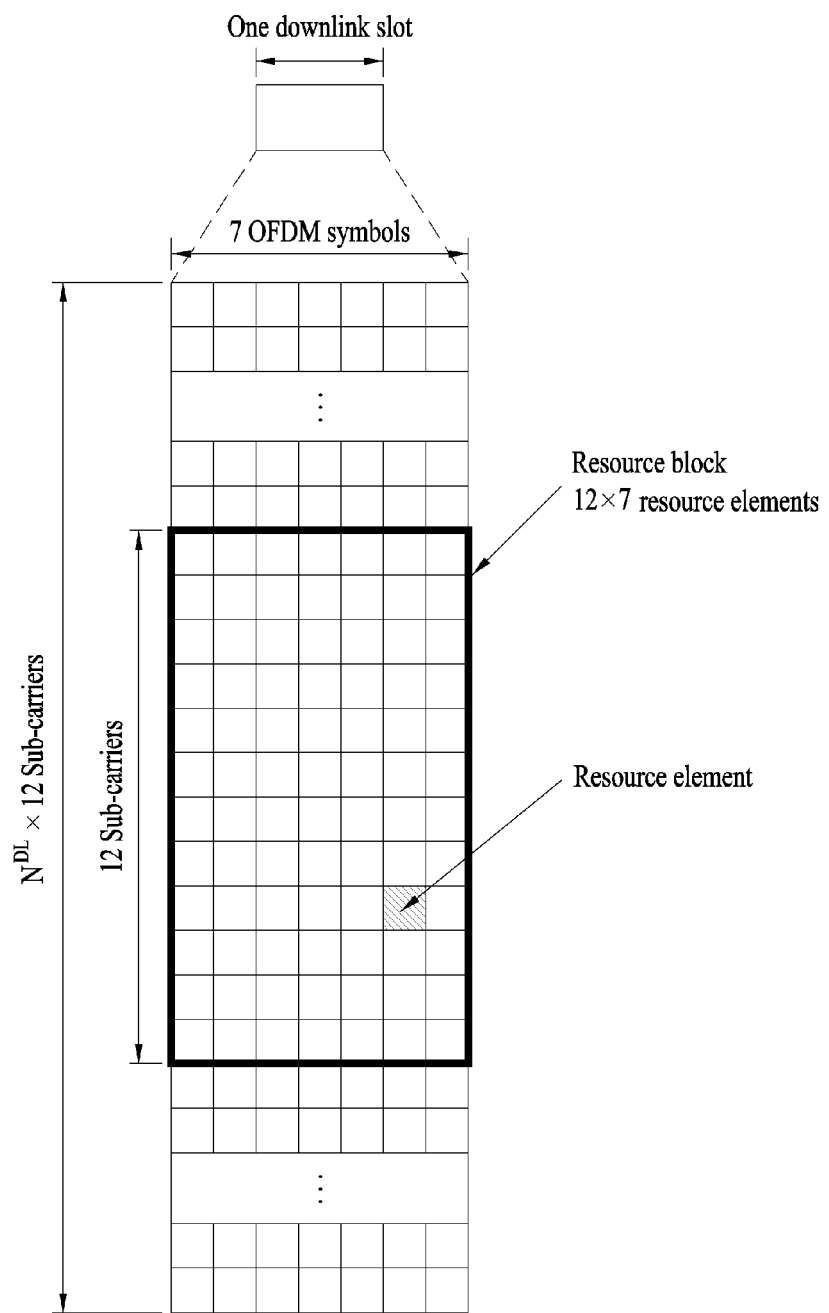
FIG. 3 is a diagram illustrating a resource grid of a downlink slot of 3GPP LTE/LTE-A system corresponding to one example of a wireless communication system.

FIG. 3 illustrates a resource grid for the duration of one DL slot in the 3GPP LTE/LTE-A system as an exemplary wireless communication system.

Referring to FIG. 3, a DL slot includes a plurality of OFDM symbols in the time domain. One DL slot includes 7 (or 6) OFDM symbols in the time domain by a plurality of Resource Blocks (RBs) in the frequency domain. Each RB includes 12 subcarriers. Each element of a resource grid is called a Resource Element (RE). One RB includes 12×7(6) REs. The number of RBs in a DL slot, $N_{RB}$ depends on a DL transmission band. The structure of a UL slot is identical to that of a DL slot, except that OFDM symbols are replaced with SC-FDMA symbols.

Figure 4:
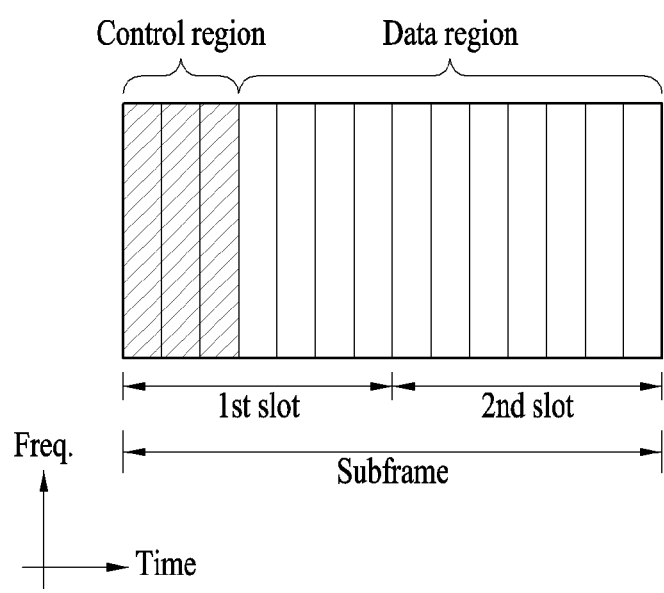
FIG. 4 is a diagram illustrating a structure of a downlink subframe of 3GPP LTE/LTE-A corresponding to one example of a wireless communication system.

FIG. 4 is a view illustrating an exemplary downlink subframe structure in the 3GPP LTE/LTE-A system as an exemplary wireless communication system.

Referring to FIG. 4, up to three (or four) OFDM symbols at the start of the first slot of a subframe corresponds to a control region to which a control channel is allocated. The other OFDM symbols of the subframe correspond to a data region to which a PDSCH is allocated. DL control channels used in 3GPP LTE include a Physical Control Format Indicator Channel (PCFICH), a Physical Downlink Control Channel (PDCCH), and a Physical Hybrid Automatic Repeat reQuest (HARQ) Indicator Channel (PHICH). The PCFICH is transmitted in the first OFDM symbol of a subframe, carrying information about the number of OFDM symbols used for transmission of control channels in the subframe. The PHICH carries a HARQ ACK/NACK signal in response to a UL transmission.

Control information carried on the PDCCH is called Downlink Control Information (DCI). DCI format 0 is defined for UL scheduling, and DCI formats 1, 1A, 1B, 1C, 1D, 2, 2A, 3, and 3A are defined for DL scheduling. Depending on its usage, a DCI format selectively includes information such as a hopping flag, an RB assignment, a Modulation Coding Scheme (MCS), a Redundancy Version (RV), a New Data Indicator (NDI), a Transmit Power Control (TPC), a cyclic shift, a DeModulation Reference Signal (DM RS), a Channel Quality Information (CQI) request, an HARQ process number, a Transmitted Precoding Matrix Indicator (TPMI), Precoding Matrix Indicator (PMI) confirmation, and so on.

The PDCCH delivers a transport format and resource allocation information for a Downlink Shared Channel (DL-SCH), a transport format and resource allocation information for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, a TPC command, Voice Over Internet Protocol (VoIP) activation indication information, and so on. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of bits in the PDCCH are determined according to the number of CCEs. An eNB determines a PDCCH format according to control information to be transmitted to a UE and adds a Cyclic Redundancy Check (CRC) to the control information. The CRC is masked by an Identifier (ID) (e.g., a Radio Network Temporary Identifier (RNTI)) according to the owner or usage of a PDCCH. If the PDCCH is directed to a specific UE, its CRC may be masked with a Cell-RNTI (C-RNTI) of the UE. If the PDCCH is for a paging message, the CRC of the PDCCH may be masked with a Paging Radio Network Temporary Identifier (P-RNTI). If the PDCCH delivers system information (more specifically, a System Information Block (SIB)), the CRC may be masked with a System Information RNTI (SI-RNTI). If the PDCCH is for a random access response, the CRC may be masked with a Random Access-RNTI (RA-RNTI).

Figure 5:
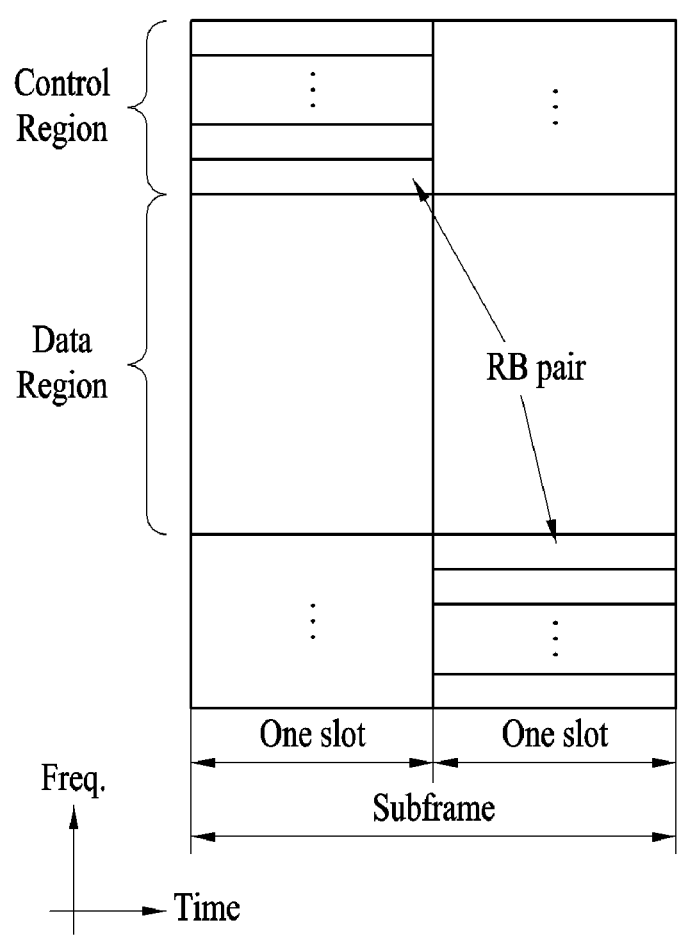
FIG. 5 is a diagram illustrating a structure of an uplink subframe of 3GPP LTE/LTE-A system corresponding to one example of a wireless communication system.

FIG. 5 is a view illustrating an exemplary uplink subframe structure in the 3GPP LTE/LTE-A system as an exemplary wireless communication system.

Referring to FIG. 5, a UL subframe includes a plurality of (two) slots. A slot may include a different number of SC-FDMA symbols according to a CP length. The UL subframe may be divided into a control region and a data region in the frequency domain. A Physical Uplink Shared Channel (PUSCH) carrying user data such as voice is allocated to the data region. A Physical Uplink Control Channel (PUCCH) carrying Uplink Control Information (UCI) is allocated to the control region. The PUCCH includes an RB pair located at both ends of the data region along the frequency axis and hops over a slot boundary.

The PUCCH may carry the following control information.

Scheduling Request (SR): information used to request UL-SCH resources. The SR is transmitted in On-Off Keying (OOK).

HARQ ACK/NACK: a response signal to a DL data packet on a PDSCH. The HARQ ACK/NACK indicates whether the DL data packet has been received successfully. A 1-bit ACK/NACK is transmitted as a response to a single DL CodeWord (CW) and a 2-bit ACK/NACK is transmitted as a response to two DL CWs.

Channel Quality Indicator (CQI): feedback information for a DL channel. MIMO-related feedback information includes an RI, a PMI, a PTI, and so on. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except for SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

An FDR Tx/Rx system is able to transmit and receive a UL signal and a DL signal at the same time on the same frequency band. Hence, the FDR Tx/Rx system is able to increase spectral efficiency as much as double compared to a legacy system that transmits and receives a UL signal and a DL signal by dividing a resource into a frequency resource and a time resource. Hence, the FDR Tx/Rx system is getting spotlight as one of core technologies of a next generation 5G mobile communication system.

In the aspect of a random wireless device, the FDR using a single frequency transmission band can be defined as a transmission resource configuration scheme that performs transmission and reception at the same time via the single frequency transmission band. As a specific example, when wireless communication is performed between a general BS (or a relay, a relay node, a remote radio head (RRH), etc.) and a wireless UE, the transmission resource configuration scheme can be comprehended as a transmission resource configuration scheme that simultaneously performs DL transmission and UL reception of the BS and DL reception and UL transmission of the wireless UE via a single frequency transmission band. As a different example, when device-to-device direct communication (D2D communication) is performed between wireless UEs, the transmission resource configuration scheme can be comprehended as a transmission resource configuration scheme that simultaneously performs transmission and reception on the same frequency transmission band between the wireless UEs. In the following, the present invention illustrates a case of performing wireless transmission and reception between a general BS and a wireless UE and describes FDR-related technologies. However, it is apparent that the present invention also includes a case of performing wireless transmission and reception between a UE and a network rather than the general BS. Moreover, it is apparent that the present invention includes a case of performing direct communication between UEs as well.

Figure 6:
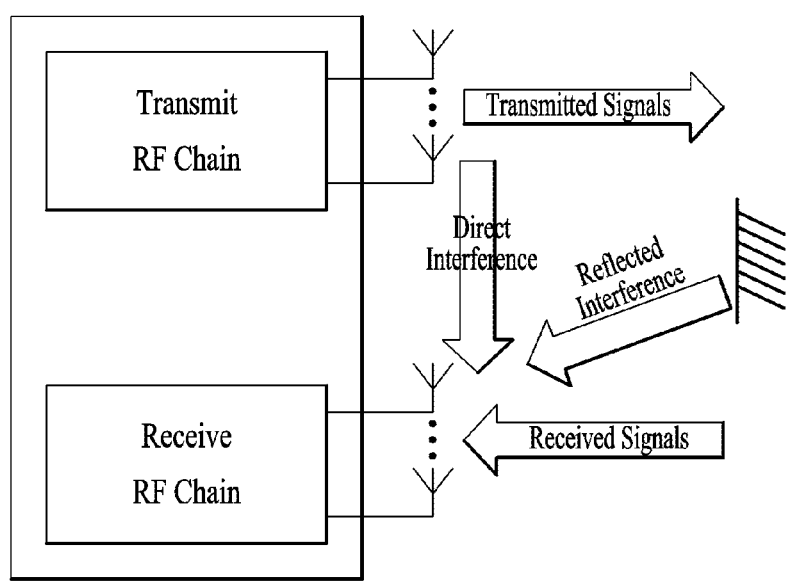
FIG. 6 is a conceptual diagram illustrating a transmission/reception link and self-interference (SI) in an FDR communication situation.

FIG. 6 is a conceptual view of Transmission (Tx) and Reception (Rx) links and Self-Interference (SI) in an FDM communication situation.

Referring to FIG. 6, there are two types of SI, direct interference caused by a signal transmitted through a Tx antenna of a BS or UE and then received at an Rx antenna of the BS or UE, and reflected interference caused by a signal reflected from adjacent topography. Due to a physical distance difference, the magnitude of SI is extremely large, compared to a desired signal. That's why it is necessary to effectively cancel SI, for implementation of an FDR system.

To effectively operate the FDR system, Self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
| --- | --- | --- | --- | --- | --- |
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{0.8\ W}$=−174 dBm+10×$\log_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 7:
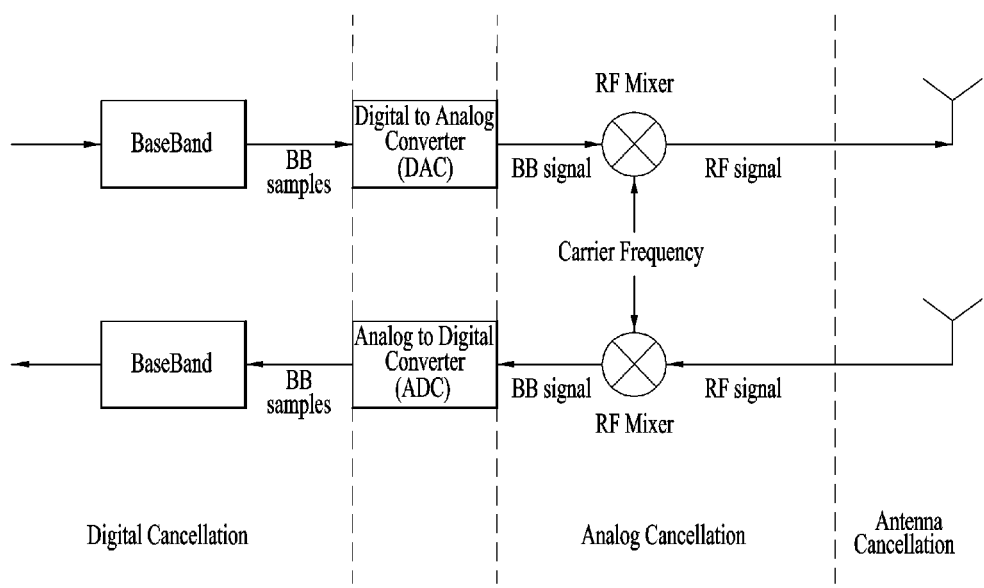
FIG. 7 is a diagram illustrating positions to which three interference schemes are applied at an RF transmission/reception end (or RF front end) of a device.

FIG. 7 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

The present invention proposes a method of transmitting a reference signal for estimating a self-interference channel in a full duplex MIMO system. In particular, the present invention proposes a reference signal transmission method to increase performance of a data transfer rate of a full duplex system by reducing the amount of resources consumed for a reference signal for estimating a self-interference channel and reduce complexity of the self-interference channel estimation.

To this end, the present invention considers MIMO (multiple inputs and outputs) environment where transmission ends and reception ends of a base station and a user equipment support full duplex communication. In this case, a basic transmission unit is configured by a transmission section in which a DL reference signal for estimating a self-interference channel of the BS is transmitted, a transmission section in which a UL reference signal for estimating a self-interference channel of the UE is transmitted, and a data transmission/reception section in which DL data and UL data of the BS and the UE are transmitted and received at the same time.

In each of the transmission sections in which the DL reference signal is transmitted and the UL reference signal is transmitted, each of the devices allocates a part of available resources to the reference signal transmission section and transmits a reference signal in each of the sections. Each of the devices estimates a self-interference channel of a current transmission unit via such a method as LS (Least-Square) or MMSE (Minimum Mean-Squared-Error) using a reference signal received through a self-interference channel in a reference signal transmission section of the current transmission unit. An estimation value of the self-interference channel estimated by each device is used for a procedure of cancelling self-interference from a section in which data is transmitted and received.

The amount of resources of a self-interference channel of a device increases in proportion to the number of antennas of the device. In particular, in order to estimate a self-interference channel in every transmission unit, it is necessary to allocate the amount of resources equal to or greater than the number of antennas of the BS and the UE to the transmission sections in which the DL reference signal and the UL reference signal are transmitted according to a transmission unit. As a result, a reference signal transmission section increases in accordance with the increase of the number of antennas in MIMO system, thereby reducing a data transmission/reception section. In particular, since DL transmission and UL transmission are simultaneously performed in a data transmission/reception section of a full duplex system, if the number of antennas of the BS or the UE increases, it may cause the decrease of data transfer rates of DL and UL at the same time.

In the following description, a reference signal corresponds to a signal for estimating a channel and the like. A resource element (RE) corresponds to a time unit or a frequency unit for transmitting a signal. In the following description, unless there is a special citation, a time resource is not distinguished from a frequency resource to apply a general signal transmission model. The time resource and the frequency resource are represented as the same resource using an RE. A transmission unit corresponds to an individual unit for transmitting a signal and the individual unit is configured by a plurality of REs predefined between a BS and a UE. A transmission unit may correspond to a slot, a resource block (RB), a subframe, a frame, or the like. A transmission unit or a transmission section includes a section in which a DL reference signal is transmitted, a section in which a UL reference signal is transmitted, and a section in which data is transmitted.

In the present invention, when a specific communication device transmits a signal in a full duplex system, since transmission and reception are performed at the same time in the full duplex system, the signal can be fed back to the communication device. In this case, a channel experienced by the signal is referred to as a self-interference channel. When the specific communication device has the N number of antennas, the self-interference channel is configured by N×N matrix. When a signal is transmitted from a specific antenna of the specific communication device, the signal is received by all antennas of the specific communication device.

Figure 8:
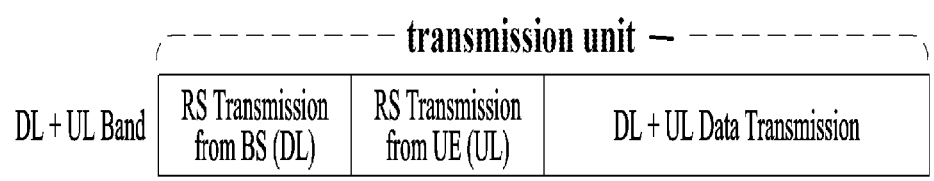
FIG. 8 is a diagram illustrating a configuration of a transmission unit according to one embodiment of the present invention.

FIG. 8 is a diagram illustrating a configuration of a transmission unit according to one embodiment of the present invention.

A transmission unit can include an initial transmission unit (or a transmission unit in which initialization is performed) and a general transmission unit. As illustrated in FIG. 8, a transmission unit is configured in a manner of being divided into a DL reference signal transmission section (RS transmission from BS (DL)), a UL reference signal transmission section (RS transmission from UE (UL)), and a data transmission/reception section (DL+UL data transmission).

The initial transmission unit proposed in the present invention corresponds to a specific transmission unit defined in a BS or a UE. A next initial transmission unit appearing after an initial transmission unit can be reconfigured based on the determination of the BS and the UE. The BS and the UE can individually designate a different transmission unit as an initial transmission unit. The general transmission unit proposed in the present invention corresponds to a transmission unit other than the initial transmission unit defined by the BS or the UE. Each device can perform the steps of determining a training resource, transmitting an orthogonal-based reference signal, estimating a self-interference channel, and storing information on a result of the self-interference channel estimation in a reference signal transmission section of the general transmission unit.

Figure 9:
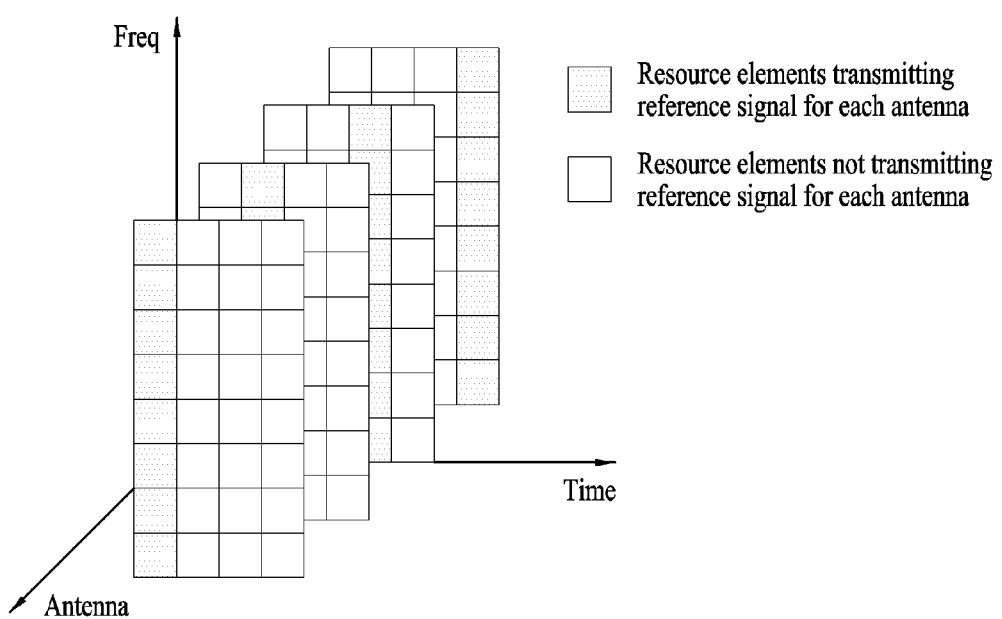
FIG. 9 is an exemplary diagram for explaining an orthogonal-based reference signal transmission scheme according to an antenna according to the present invention.

FIG. 9 is an exemplary diagram for explaining an orthogonal-based reference signal transmission scheme according to an antenna based on the present invention.

As shown in FIG. 9, a reference signal transmission scheme proposed in the present invention includes an orthogonal-based reference signal transmission scheme that transmits a reference signal by allocating an additional resource according to an antenna of each device. A BS or a UE can estimate a self-interference channel between a specific transmission antenna of the BS/UE and all reception antennas of the BS/UE through reference signals which are transmitted from the specific transmission antenna of the BS/UE and received through all antennas of the BS/UE.

Figure 10:
FIG. 10 is an exemplary diagram for explaining an operation of a transmission end of a base station or a user equipment in a full duplex mode.

FIG. 10 is an exemplary diagram for explaining an operation of a transmission end of a base station or a user equipment in a full duplex mode.

FIG. 10 illustrates a signal transmission end used in a data transmission/reception section of a BS/UE in a full duplex mode (or the BS/UE operating in the full duplex mode) considered in the present invention. A transmission end of a communication device can include a MIMO precoding unit, a power allocation unit, an antenna, and the like. A symbol sequence corresponds to a symbol block to be transmitted by each device (e.g., BS or UE) according to a transmission unit. The MIMO precoding unit can perform MIMO precoding on a symbol block. The power allocation unit performs a procedure of controlling a distance with a receiving side and power and a procedure of allocating power in consideration of a transmission power limit of the communication device, and the like. A transmitted signal shown in FIG. 10 corresponds to a signal finally transmitted by the communication device after passing through a series of procedures such as MIMO precoding, power allocation, and the like of the transmission end. A signal transmitted in a $j^{th}$ RE of a $t^{th}$ transmission unit of a transmission device can be represented as equation 1 described in the following.

$$x_{t,j} = W_t^s \sqrt{P_t^s} s_{t,j} \qquad \text{[Equation 1]}$$

In equation 1, $S_{t,j}$ corresponds to a symbol vector in the $j^{th}$ RE of the $t^{th}$ transmission unit, $W_t^s$ corresponds to a precoding matrix for the $S_{t,j}$, and $P_t^s$ corresponds to a diagonal matrix indicating power allocated to each antenna for the $S_{t,j}$.

Figure 11:
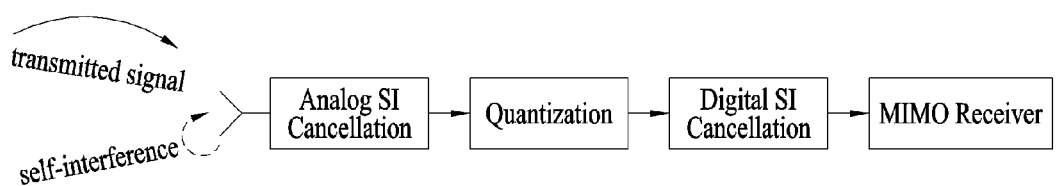
FIG. 11 is an exemplary diagram for explaining an operation of a reception end of a base station or a user equipment in a full duplex mode.

FIG. 11 is an exemplary diagram for explaining an operation of a reception end used in a data transmission/reception section of a base station or a user equipment in a full duplex mode.

FIG. 11 explains an operation of a signal receiving end used in a data transmission/reception section in a BS or a UE in a full duplex mode considered in the present invention. The receiving end can include a reception antenna, an analog self-interference cancellation unit, a quantization unit, a digital self-interference cancellation unit, and a MIMO receiver.

In the aspect of a communication device, a desired signal corresponds to a signal transmitted from a transmitting side. Self-interference corresponds to a self-interference signal transmitted by a communication device and the signal fed back to the communication device. A reception antenna of a receiving end receives a desired signal and a self-interference signal. The analog self-interference cancellation unit performs a self-interference cancellation procedure in an analog circuit. The quantization unit performs a procedure of quantizing an analog signal into a digital signal. The digital self-interference cancellation unit cancels self-interference from a quantized digital signal. After the self-interference cancellation procedure is performed on the digital signal, the MIMO receiver performs a signal detection procedure and a demodulation procedure of a MIMO system using the digital signal as an input. In this case, a signal $y_{t,j}$ outputted in the $j^{th}$ RE of the $t^{th}$ transmission unit in each device can be represented as equation 2 described in the following.

$$y_{t,j} = G_{t,j} H_t^d L_t W_t^d \sqrt{P_t^d} d_{t,j} + a G_{t,j}(H_t^s - \hat{H}_t^s) x_{t,j} + G_{t,j}(q_{t,i} + n_{t,j}) \qquad \text{[Equation 2]}$$

In equation 2, $d_{t,j}$ corresponds to a desired signal vector in the $j^{th}$ RE, $G_{t,j}$ corresponds to a MIMO filter matrix, and $H_t^d$ and $H_t^s$ respectively correspond to a data channel and a self-interference channel experienced by $d_{t,j}$ and $x_{t,j}$. $W_t^d$ corresponds to a precoding matrix for $d_{t,j}$, $P_t^s$ corresponds to a diagonal matrix indicating power allocated according to an antenna in a transmitting end of a communication device for $d_{t,j}$, $L_t$ corresponds to a path loss experienced by $d_{t,j}$, a corresponds to an analog self-interference cancellation gain of a linear scale, $q_{t,j}$ corresponds to a noise vector generated in a quantization procedure, $n_{t,j}$ corresponds to an additive white Gaussian noise vector, and $\hat{H}_t^s$ corresponds to a matrix estimated for a self-interference channel ($H_t^s$) obtained from a reference signal transmission section of a current transmission unit.

In equation 2, $aG_{t,j}(H_t^s - \hat{H}_t^s)x_{t,j}$ corresponds to a residual self-interference signal remained in an output signal of a receiving end. In particular, $\|aG_{t,j}(H_t^s - \hat{H}_t^s)x_{t,j}\|^2$ corresponds to the sum of power of the residual self-interference signal components. The minimum of the sum of power of the residual self-interference signal components can be represented as equation 3 described in the following.

$$\min\|aG_{t,j}(H_t^s - \hat{H}_t^s)x_{t,j}\| = \qquad \text{[Equation 3]}$$

$$\min \sum_{n=1}^{N} V_t(n,n) \left( \sum_{k=1}^{n} \sigma_{t,n,k}^2 Z_{t,j}(k,k) \right)$$

In equation 3, N corresponds to the number of antennas of a communication device. When $V_t = W_t^s P_t^s (W_t^s)^H$ is satisfied, $V_t(n,n)$ corresponds to an $n^{th}$ diagonal element of a matrix $V_t$. When $Z_{t,j} = G_{t,j}(G_{t,j})^H$ is satisfied, $Z_{t,j}(n,n)$ corresponds to an $n^{th}$ diagonal element of a matrix $Z_{t,j}$. When $\sigma_{t,n,k}^2 = E[(h_{t,n,k}^s - \hat{h}_{t,n,k}^s)(h_{t,n,k}^s - \hat{h}_{t,n,k}^s)^H]$ is satisfied, it may indicate an error variance for an estimation value of an element $h_{t,n,k}^s$ positioned at an $n^{th}$ column and a $k^{th}$ row of a self-interference channel matrix.

In the present invention, cost corresponding to the sum of power of the residual self-interference signal components indicates the cost of the right side of the equation 3 consisting of error variance for channel estimation and a precoding matrix, transmit power, and a MIMO filter. The equation 3 indicates that the minimization of the cost and the minimization of the sum of power of the residual self-interference signals have the same meaning.

When LS estimation is assumed, $\sigma_{t,n,k}^2$ of the equation 3 can be represented as equation 4 described in the following via the number of REs ($r_{t,n}$) of a reference signal transmitted from an $n^{th}$ antenna of a current transmission unit.

$$\sigma_{t,n,k}^2 = \begin{cases} \dfrac{2 - 2\sqrt{c^n}}{\kappa_{n,k} + 1} + \dfrac{1}{r_{t-t_n,n} \cdot snr} & r_{t,n} = 0 \\[2ex] \dfrac{1}{r_{t,n} \cdot snr} & r_{t,n} \geq 1 \end{cases} \qquad \text{[Equation 4]}$$

In the equation 4, snr corresponds to a ratio of a signal to noise of a transmitted reference signal, $k_{n,k}$ corresponds to a Rician factor indicating a LOS (line-of-sight) component of $h_{t,n,k}^s$, c corresponds to a correlation coefficient of a NLOS (non-line-of-sight) component of a self-interference channel between two consecutive transmission units, $t_n$ corresponds to the number of transmission units elapsed from the last transmission unit to which an RE for transmitting a reference signal is allocated from an $n^{th}$ antenna, and $r_{t-t_n,n}$ corresponds to the number of REs used for transmitting a reference signal from the $n^{th}$ antenna in a transmission unit prior to a $t_n$ transmission unit.

In the equation 4, $r_{t,n}=0$ indicates a case that a reference signal transmitted via the $n^{th}$ antenna does not exist in a current transmission unit. In this case, it indicates that a value estimated in a previous transmission unit (t−$t_n$ transmission unit) is used as a self-interference channel estimation value for the $n^{th}$ antenna as it is in the current transmission unit.

Figure 12:
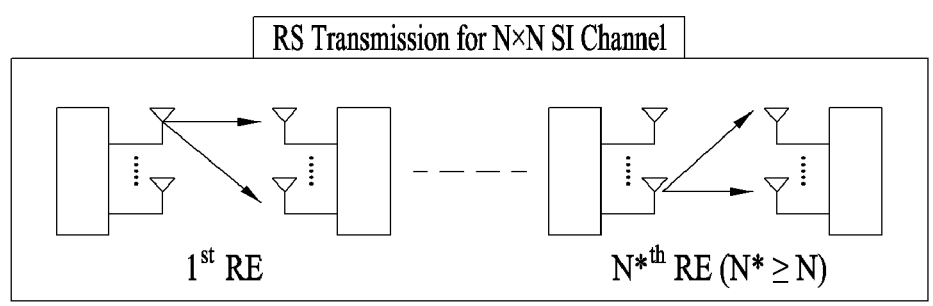
FIG. 12 is an exemplary diagram for explaining a transmission of a reference signal in an initial transmission unit of a communication device.

FIG. 12 is an exemplary diagram for explaining a transmission of a reference signal in an initial transmission unit of a communication device.

A communication device can start operations according to the present invention from an operation step in an initial transmission unit. In the aspect of the communication device (BS, UE), the number of resources equal to or greater than the number of antennas of the communication device is allocated to a reference signal transmission section in the initial transmission unit. When the number of antennas of the communication device corresponds to N, in order to estimate the whole of N×N self-interference channel matrix of the device, as shown in FIG. 12, a reference signal is configured using REs equal to or greater than the N and the reference signal is transmitted. In particular, it is able to estimate the whole of a self-interference channel of a current initial transmission unit using a method such as LS, MMSE estimation, or the like for a reference signal received via the self-interference channel in a reference signal transmission section of the initial transmission unit of the communication device.

Figure 13:
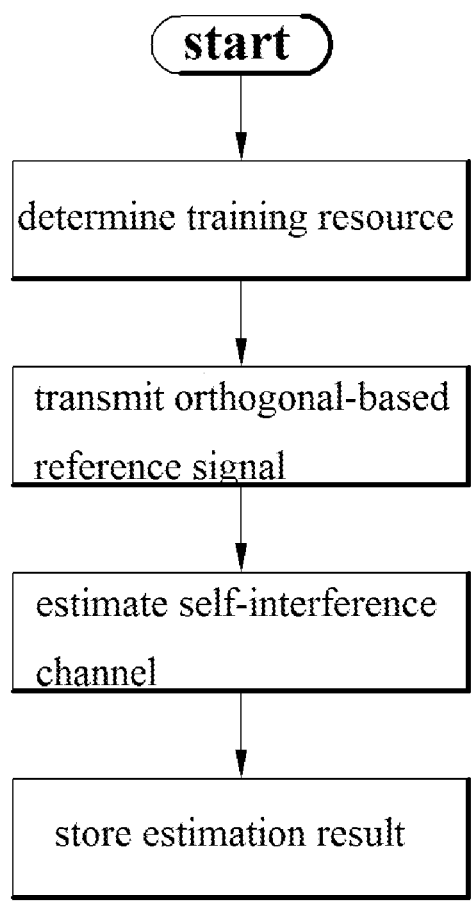
FIG. 13 is an exemplary diagram for explaining an operation step in a reference signal transmission section of a general transmission unit.

FIG. 13 is an exemplary diagram for explaining an operation step in a reference signal transmission section of a general transmission unit.

Referring to FIG. 13, a communication device can preferentially determine a training resource. In this case, the training resource corresponds to a resource to be used for estimating a self-interference channel of each antenna. The communication device determines the amount of resources to be used for estimating a self-interference channel of each antenna. Subsequently, the communication device allocates the determined amount of training resources to each antenna and can transmit an orthogonal-based reference signal using an additional resource according to an antenna. Subsequently, the communication device can estimate a self-interference channel from each antenna of a current transmission unit using a method such as LS, MMSE estimation, or the like using reference signals received via the self-interference channel. In this case, in order to estimate a self-interference channel of an antenna which has failed to receive a resource in the current transmission unit, the communication device may use a value estimated for a self-interference channel calculated for a previous transmission unit stored in a memory 160/185 as an estimation value in the current transmission unit. The communication device can store information on a self-interference channel estimation result in the current transmission unit in the memory 160/185.

Figure 14:
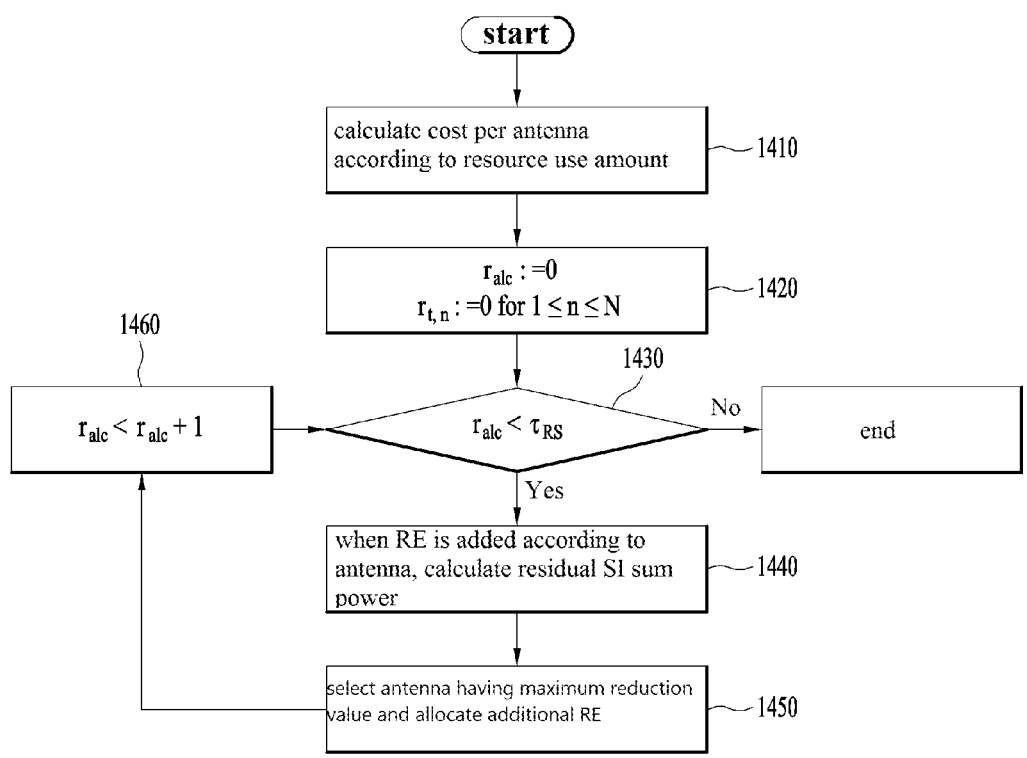
FIG. 14 is a flowchart for explaining a procedure for a communication device to determine a training resource.

FIG. 14 is a flowchart for explaining a procedure for a communication device to determine a training resource.

Referring to FIG. 14, a communication device calculates cost corresponding to the sum of power of the residual self-interference signal components per antenna according to the amount of resource use [S1410]. In particular, when the communication device allocates an RE for transmitting a reference signal in each antenna, the communication device calculates the cost corresponding to the sum of power of the residual self-interference signal components according to the amount of allocated REs. In this case, the cost corresponding to the sum of power of the residual self-interference signal components is calculated as equation 5 described in the following by putting the equation 4 into the right side of the equation 3.

$$e_{t,n}(i) = \begin{cases} V_t(n,n)\left(\sum_{k=1}^{N}\left(\frac{2-2\sqrt{c^n}}{\kappa_{n,k}+1} + \frac{1}{r_{t-t_n,n}\cdot snr}\right)Z_{t,j}(k,k)\right) & i = 0 \\ V_t(n,n)\left(\sum_{k=1}^{N}\frac{Z_{t,j}(k,k)}{i\cdot snr}\right) & 1 \leq i \leq \tau_{RS} \end{cases}$$ [Equation 5]

In the equation 5, when the i number of REs are allocated, $e_{t,n}(i)$ corresponds to cost corresponding to the sum of power of the residual self-interference signal components in an $n^{th}$ antenna. $\tau_{RS}$ corresponds to the total number of REs usable for transmitting a reference signal in a corresponding transmission device.

After the $e_{t,n}(t)$ is calculated, both $r_{alc}$ and $r_{t,n}$ reset to 0 [S1420]. In this case, the $r_{alc}$ corresponds to the number of currently allocated REs. After the $r_{alc}$ and $r_{t,n}$ reset, the communication device compares a size of the $r_{alc}$ with a size of the $\tau_{RS}$ and can perform an RE allocation procedure described in the following until the $r_{alc}$ corresponding to the number of currently allocated REs becomes the $\tau_{RS}$ [S1430]. When the $r_{alc}$ is smaller than the $\tau_{RS}$, if an RE to be used according to an antenna for RE allocation is added, the communication device can calculate a level of reduction of the cost corresponding to the sum of power of the residual self-interference signal components based on equation 6 described in the following [S1440].

$$q_{t,n}(r_{t,n}) = e_{t,n}(r_{t,n}) - e_{t,n}(r_{t,n}+1)$$ [Equation 6]

In the equation 6, when an additional RE is allocated to an $n^{th}$ antenna, $q_{t,n}(r_{t,n})$ corresponds to a level of reduction of cost corresponding to the sum of power of the residual self-interference signal components.

After the $q_{t,n}(r_{t,n})$ is calculated, it is able to select an antenna having the maximum reduction value of the cost corresponding to the sum of power of the residual self-interference signal components and allocate an additional RE based on equation 7 described in the following.

$$r_{t,n^*} := r_{t,n^*}+1, \text{ where } n^* = \arg\max_n q_{t,n}(r_{t,n})$$ [Equation 7]

n* shown in the equation 7 indicates a selected antenna having the maximum reduction value of the cost corresponding to the sum of power of the residual self-interference signal components.

The procedures of FIG. 14 are summarized in the following. First of all, when cost per antenna is calculated according to the amount of resource use, a communication device calculates the cost corresponding to the sum of power of the residual self-interference signal components, which are anticipated when each antenna has the amount of REs ranging from 0 to $\tau_{RS}$, according to an antenna via the equation 5. Subsequently, the communication device resets the amount of REs, which are allocated to transmit a reference signal according to an antenna in a current transmission unit, to 0 and starts a repetition procedure. As a first step of the repetition procedure, when each antenna has an additional RE in addition to the currently configured amount of REs (or the number of currently allocated REs), the communication device calculates the amount of reduction of the cost corresponding to the sum of power of the residual self-interference signal components based on the equation 6. Subsequently, the communication device compares the amount of reduction of the cost with the amount of reduction of the cost calculated in the previous step and selects an antenna having the greatest amount of reduction of the cost. In particular, the communication device selects an antenna having the greatest amount of reduction of the cost corresponding to the sum of power of the residual self-interference signal components from among the entire antennas based on the equation 7.

After the antenna is selected, the communication device increases the number of REs for transmitting a reference signal by 1 in the antenna and ends one repetition procedure. In particular, an RE is allocated via one repetition procedure. The repetition procedure is repeated as many as $\tau_{RS}$ until the total number of REs allocated to each antenna to transmit a reference signal in a current transmission unit becomes $\tau_{RS}$. When antennas and REs are selected to estimate a self-interference channel, if the $\tau_{RS}$ number of REs for estimating a channel is selected from a plurality of subframes, a channel estimation result used in the equation 6 can be updated in every subframe. On the contrary, if the $\tau_{RS}$ number of REs for estimating a channel is selected from a single subframe, the channel estimation result used in the equation 6 may use a channel estimation result updated until the subframe.

Figure 15:
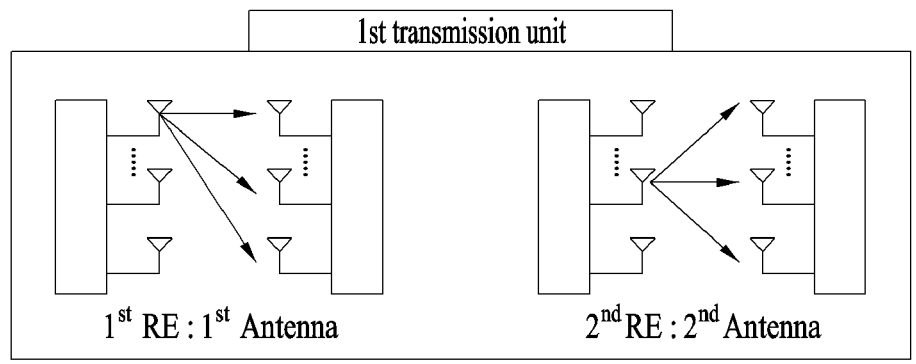
FIG. 15 is a diagram illustrating an example for a communication device to allocate an RE according to an antenna in a reference signal transmission section.
Figure 15:
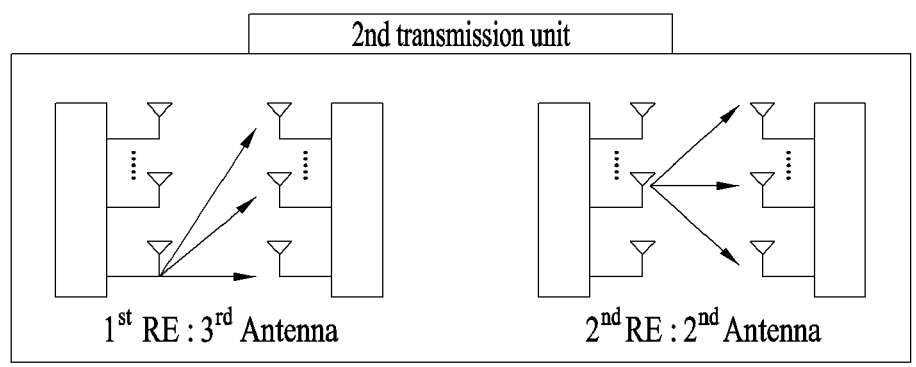
Figure 15:
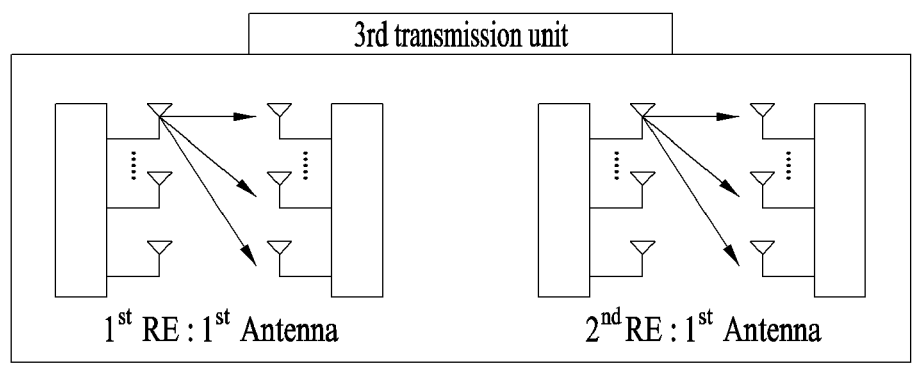

FIG. 15 is a diagram illustrating an example for a communication device to allocate an RE according to an antenna in a reference signal transmission section.

For example, FIG. 15 assumes a case that the number of REs usable for transmitting a reference signal in every transmission unit corresponds to 2 in a communication device having 3 antennas. In FIG. 15, a transmission unit in which initialization is performed is omitted and a general transmission unit is illustrated only.

First of all, the first transmission unit is explained. When a reference signal is allocated to the first antenna in the first transmission unit, since it is determined as the sum of power of the residual self-interference signal components is minimized, the first RE is preferentially allocated to the first antenna. When a reference signal is allocated to the second antenna after assuming that the reference signal is allocated to the first antenna, since it is determined as the sum of power of the residual self-interference signal components is minimized, the second RE is allocated to the second antenna and the reference signal for the first transmission unit is transmitted according to an allocation result.

Subsequently, the second transmission unit is explained. When a reference signal is allocated to the third antenna in the second transmission unit, since it is determined as the sum of power of the residual self-interference signal components is minimized, the first RE is preferentially allocated to the third antenna. When a reference signal is allocated to the second antenna after assuming that the reference signal is allocated to the third antenna, since it is determined as the sum of power of the residual self-interference signal components is minimized, the second RE is allocated to the second antenna and the reference signal for the second transmission unit is transmitted according to an allocation result.

Subsequently, the third transmission unit is explained. When a reference signal is allocated to the first antenna in the third transmission unit, since it is determined as the sum of power of the residual self-interference signal components is minimized, the first RE is preferentially allocated to the first antenna. When a reference signal is additionally allocated to the first antenna after assuming that the reference signal is allocated to the first antenna, since it is determined as the sum of power of the residual self-interference signal components is minimized, the second RE is additionally allocated to the first antenna and the reference signal for the third transmission unit is transmitted according to an allocation result.

Figure 16:
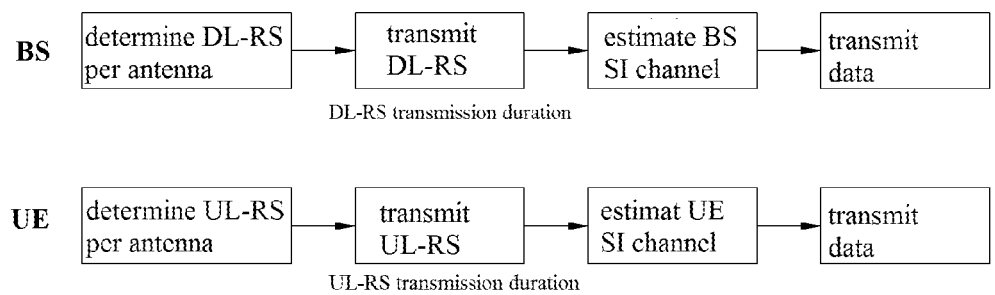
FIG. 16 is a diagram illustrating operation flows of communication devices (a base station and a user equipment) in a general transmission unit according to the present invention.

FIG. 16 is a diagram illustrating operation flows of communication devices (a base station and a user equipment) in a general transmission unit according to the present invention.

The BS can determine the number of REs according to an antenna of DL reference signals before starting a transmission in a DL reference signal transmission section in every transmission unit. The BS transmits reference signals in the DL reference signal transmission section according to a result of the determined number of REs, estimates a self-interference channel of the BS, and can transmit DL data in a data transmission section.

Similarly, a UE can determine the number of REs according to an antenna of UL reference signals before starting a transmission in a UL reference signal transmission section in every transmission unit. The UE transmits reference signals in the UL reference signal transmission section according to a result of the determined number of REs, estimates a self-interference channel from a channel on which the transmitted reference signals are fed back, and transmits UL data in a data transmission section.

According to the related art, in order for a communication device to estimate a self-interference channel, it is necessary for the communication device to use REs equal to or greater than the number of antennas to transmit a reference signal in every transmission unit. However, according to the present invention, it is able to estimate a self-interference channel by using REs less than the number of antennas only in transmitting a reference signal. In particular, according to the present invention, since it is able to minimize the sum of power of the residual self-interference signal components after a receiving end procedure of a communication device, when the number of REs to be used for a reference signal section is given, it is able to maximize performance of a full duplex system.

When the number of REs for transmitting a reference signal is reduced according to the present invention, it is able to increase the number of REs to be used for a data transmission/reception section. In particular, since DL transmission and UL transmission are simultaneously performed in a data transmission/reception section of a full duplex system, when either a BS or a UE uses REs less than the number of antennas to transmit a reference signal, it is able to obtain an effect of increasing a data transfer rate in DL and UL at the same time.

When the number of REs for transmitting a reference signal is reduced according to the present invention, since a size of a matrix for estimating a self-interference channel is reduced via a method such as LS, MMSE, or the like in a receiving end of a communication device, it is able to reduce complexity of estimating a self-interference channel.

The error variation value $\sigma_{t,n,k}^2$ of the equation 4 described in the present invention can be applied not only to LS estimation but also to MMSE estimation. This is because, since an SNR region of a reference signal received via a self-interference channel corresponds to a high SNR region, the LS estimation and the MMSE estimation achieve almost the same performance. Meanwhile, the step of determining a training resource proposed in the present invention can also be applied to a case that REs equal to or greater than the number of antennas are used for transmitting a reference signal.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of estimating a self-interference channel and an apparatus therefor can be applied to various wireless communication systems including 3GPP LTE/LTE-A, 5G communication system, and the like.

What is claimed is:

1. A method for estimating a self-interference channel by a communication device operating in a full duplex mode, the method comprising:
   determining an amount of resource to be used for estimating the self-interference channel per antenna;
   transmitting a reference signal through a resource distinguished by each antenna according to the amount of resource determined per each antenna; and
   estimating the self-interference channel based on the reference signal,
   wherein the determining the amount of resource further comprises:
   based on an additional resource unit is allocated per antenna, determining an antenna having a maximum reduction value of a sum of power of residual self-interference signal components in a receiving end of the communication device;
   allocating the additional resource unit for the reference signal to be transmitted in the determined antenna; and
   repeating the antenna determining and the additional resource unit allocating until a total amount of resource allocated to each antenna becomes identical to a total number of available resource units for transmitting the reference signal.

2. The method of claim 1, wherein the amount of resource to be used for estimating the self-interference channel per each antenna corresponds to an amount of resource which is allocated when the total amount of resource allocated to each antenna becomes identical to the total number of available resource units for transmitting the reference signal.

3. The method of claim 1, wherein the repeating is performed as many as the total number of available resource units for transmitting the reference signal.

4. The method of claim 1, wherein the resource unit corresponds to a resource element (RE).

5. The method of claim 1, further comprising:
   storing information on an estimation result for the self-interference channel.

6. The method of claim 1, wherein the self-interference channel is estimated using the reference signal received per each antenna.

7. The method of claim 1, wherein the communication device corresponds to a user equipment or a base station.

8. A communication device of a full duplex mode for estimating a self-interference channel, the communication device comprising:
   a processor configured to determine an amount of resource to be used for estimating the self-interference channel per antenna; and
   a transmitter configured to transmit a reference signal through a resource distinguished by each antenna according to the amount of resource determined per antenna,
   wherein the processor is configured to estimate the self-interference channel based on the reference signal,
   wherein, based on the amount of resource is determined, the processor determines an antenna having a maximum reduction value of a sum of power of residual self-interference signal components in a receiving end of the communication device when an additional resource unit is allocated per each antenna, allocates the additional resource unit for the reference signal to be transmitted in the determined antenna, and repeats determination of the antenna and allocation of the additional resource unit until the total amount of resource allocated to each antenna becomes identical to a total number of available resource units for transmitting the reference signal.

9. The communication device of claim 8, wherein the amount of resource to be used for estimating the self-interference channel per antenna corresponds to an amount of resource which is allocated when the total amount of resource allocated to each antenna becomes identical to the total number of available resource units for transmitting the reference signal.

10. The communication device of claim 8, wherein the processor is configured to repeat as many as the total number of resource units available for transmitting the reference signal.

11. The communication device of claim 8, wherein the resource unit corresponds to a resource element (RE).

12. The communication device of claim 8, wherein the self-interference channel is estimated using the reference signal received per antenna.

13. The communication device of claim 8, wherein the processor estimates the self-interference channel using the reference signal received per antenna.

14. The communication device of claim 8, wherein the communication device corresponds to a user equipment or a base station.

* * * * *